US009650850B2

(12) United States Patent
Jamison et al.

(10) Patent No.: US 9,650,850 B2
(45) Date of Patent: May 16, 2017

(54) METHODS FOR REPLENISHING PARTICLES SCREENED FROM DRILLING FLUIDS

(71) Applicant: Halliburton Energy Services, Inc., Houston, TX (US)

(72) Inventors: Dale E. Jamison, Humble, TX (US); Don L. Whitfill, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 230 days.

(21) Appl. No.: 14/386,088

(22) PCT Filed: Nov. 1, 2013

(86) PCT No.: PCT/US2013/068057
§ 371 (c)(1),
(2) Date: Sep. 18, 2014

(87) PCT Pub. No.: WO2015/065475
PCT Pub. Date: May 7, 2015

(65) Prior Publication Data
US 2016/0237768 A1 Aug. 18, 2016

(51) Int. Cl.
E21B 21/06 (2006.01)
C09K 8/03 (2006.01)

(52) U.S. Cl.
CPC .............. E21B 21/062 (2013.01); C09K 8/03 (2013.01); E21B 21/06 (2013.01); E21B 21/065 (2013.01)

(58) Field of Classification Search
CPC . C09K 8/032; C09K 8/36; C09K 8/16; C09K 8/46; C09K 8/68; C09K 8/32; C09K 8/035; C09K 2208/18; C09K 8/40; C09K 8/467; C09K 8/502; C09K 8/5045; C09K 8/03; C09K 8/12; C09K 8/48; C09K 8/265; C09K 8/52; C09K 2208/08; C09K 8/34; C09K 8/424; C09K 8/512; C09K 8/565; C09K 8/665; C09K 8/70; C09K 8/426; C09K 8/508; C09K 8/92; C09K 19/54; C09K 2019/528; C09K 8/536; C09K 8/5756; E21B 33/138; E21B 33/13; E21B 21/003; E21B 33/03; E21B 43/10; E21B 47/0005; E21B 21/01; E21B 21/065; E21B 21/068; E21B 33/134; E21B 43/16; E21B 44/00; E21B 7/06; E21B 21/00; E21B 21/06
See application file for complete search history.

(56) References Cited

U.S. PATENT DOCUMENTS

| 2,919,898 | A | * | 1/1960 | Marwil | ................. | E21B 21/065 |
| | | | | | | 175/217 |
| 4,247,312 | A | | 1/1981 | Thakur et al. | | |
| 2004/0224852 | A1 | | 11/2004 | Halliday et al. | | |
| 2005/0204961 | A1 | | 9/2005 | Chatterji et al. | | |
| 2006/0096759 | A1 | * | 5/2006 | Reddy | ...................... | C09K 8/16 |
| | | | | | | 166/295 |
| 2009/0145664 | A1 | | 6/2009 | Larson et al. | | |
| 2011/0278006 | A1 | * | 11/2011 | Sanders | ................... | C09K 8/16 |
| | | | | | | 166/293 |

FOREIGN PATENT DOCUMENTS

WO 2015065475 A1 5/2015

OTHER PUBLICATIONS

Material safety data sheet of Industries Specialties Mfg, downloaded on Sep. 15, 2016.*
Product data sheet of dfeshakerscreens downloaded on Sep. 15, 2016.*
Material data sheet AV Website Marketing Group, LLC downloaded on Sep. 15, 2016.*
Product data sheet, Halliburton, downloaded on Sep. 15, 2016.*
https://en.wikipedia.org/w/index.php?title=Polypropylene&printable=yes downloaded on Sep. 15, 2016.*
International Search Report and Written Opinion for PCT/US2013/068057 dated Aug. 8, 2014.
Examination Report received in corresponding Australian Application No. 2013403905, dated Jul. 1, 2016.

* cited by examiner

Primary Examiner — Kumar R Bhushan
(74) Attorney, Agent, or Firm — McDermott Will & Emery LLP

(57) ABSTRACT

Methods for selectively replacing the larger particles screened from a drilling fluid may include: circulating a drilling fluid comprising a base fluid and a plurality of particles through a wellbore penetrating a subterranean formation; passing the drilling fluid over a screen having a mesh size, thereby separating the plurality of particles into screened particles having a diameter greater than or equal to the mesh size and retained particles having a diameter smaller than the mesh size; adding a concentration of replenishment particles to the drilling fluid that comprises the base fluid and the retained particles, wherein a PSD of the replenishment particles has a $d25_{REP}$ greater than or equal to the mesh size; and re-circulating the drilling fluid including the replenishment particles back into the wellbore.

12 Claims, 4 Drawing Sheets

METHODS FOR REPLENISHING PARTICLES SCREENED FROM DRILLING FLUIDS

BACKGROUND

The exemplary embodiments described herein relate to methods for selectively replacing the larger particles screened from a drilling fluid.

Drilling fluids often include a plurality of particles that impart specific properties (e.g., viscosity, mud weight, and the like) and capabilities (e.g., wellbore strengthening) to the drilling fluid. It should be understood that the terms "particle" and "particulate," as used in this disclosure, includes all known shapes of materials, including substantially spherical materials, fibrous materials, polygonal materials (such as cubic materials), and combinations thereof.

For example, weighting agents (i.e., particles having a specific gravity greater than the base fluid of the drilling fluid) can be used to produce drilling fluids with the desired mud weight (i.e., density), which affects the equivalent circulating density ("ECD") of the drilling fluid. During drilling operations, for example, the ECD is often carefully monitored and controlled relative to the fracture gradient of the subterranean formation. Typically, the ECD during drilling is close to the fracture gradient without exceeding it. When the ECD exceeds the fracture gradient, a fracture may form in the subterranean formation and drilling fluid may be lost into the subterranean formation (often referred to as lost circulation). In another example, lost circulation materials ("LCMs") can be used to strengthen the wellbore and increase the hoop stress around the wellbore, which allows for a higher ECD. The LCMs incorporate into and plug microfractures extending from the wellbore, so as to mitigate fracture propagation and lost circulation.

The properties and capabilities that the particles impart on the drilling fluid depend on, inter alia, the particle size distribution ("PSD") of the particles, the specific gravity of the particles, the concentration in the drilling fluid, and the like. In many instances, to achieve the desired properties in the drilling fluid, a mixture of types of particles (e.g., varying by composition, shape, or the like) are used. Typically, the PSD of the particles in a drilling fluid is broad.

During many drilling operations, the drilling fluid is circulated through the wellbore (e.g., down the drill string and back up through the annulus between the drill string and the wellbore), passed through shakers to remove cuttings and debris produced during drilling, and recirculated back into the wellbore. Shakers typically include one or more screens with holes of a specific size (also referred to as the mesh size of the screen) to allow smaller particles and fluid through but retain larger particles for removal.

In removing the cuttings with shaker systems, some of the particles in the drilling fluid that impart the desired properties and capabilities are also removed, thereby adversely altering the properties and capabilities of the drilling fluid. To account for these changes, operators are required to add more particle additives (e.g., weighting agents and LCMs) back into the drilling fluid. However, the shaker removes only the particles larger than the screen size, and the particle additives mixed into the drilling fluid have a broad PSD. Therefore, to fully replace the concentration of larger particles, the concentration of smaller particles increases, and the PSD remains changed. Further, the total volume percent of the particles in the drilling fluid increases. The higher volume percent increases the viscosity and, as a consequence of the particles' specific gravity, increases the density of the drilling fluid.

To combat the changes to fluid properties, operators often dilute the drilling fluid and add additional additives to maintain the desired fluid properties, such as emulsifiers and the like. Often the base fluid used to dilute the drilling fluid and the other additives are expensive. Additionally, a dilution approach increases the overall volume of fluid that the operator has to handle or have stored on-site or shipped to the well site, which further increases costs and complicates logistics, especially in off-shore drilling. However, while the viscosity may be addressed to some degree by dilution, the PSD is still not the same as the original PSD (i.e., the smaller diameter particles have a higher concentration relative to the larger particles), which imparts different properties to the drilling fluid. Since drilling fluid is circulated several times through the wellbore during drilling operations, this problem of maintaining drilling fluid properties and the consequences of common dilution techniques can become cumulative and expensive.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The exemplary embodiments described herein relate to methods for selectively replacing the larger particles screened from a drilling fluid.

The methods described herein may mitigate significant changes in the PSD of particles in a drilling fluid during a drilling operation. In turn, the viscosity, mud weight, and wellbore strengthening capabilities, among other things, may vary minimally during the drilling operation. Further, the methods described herein do not effectively dilute the drilling fluid and, therefore, do not exhibit the storage/transportation issues and cost associated with conventional methods that attempt to mitigate variations in the properties and capabilities of drilling fluids during a drilling operation.

The drilling fluids described herein comprise a base fluid and a plurality of particles having a particle size distribution ("PSD"). As used herein the term, "particle size distribution" refers to a list of values or a mathematical function that defines the relative amount by volume of particles present within a fluid according to size. In some instances, the particles described herein may have a PSD characterized by a d10, a d25, a d50, a d75, and a d90. As used herein, the term "dn" (e.g., d10, d25, d50, d75, or d90) refers to a diameter for which n % by volume of the particles have a smaller diameter. The dn for particles described herein may be determined by any suitable means (e.g., sieve analysis, optical counting methods, image analysis, laser diffraction, light scattering, interaction with x-rays, interactions with neutrons, acoustic spectroscopy, sedimentation, elutriation, and the like). One skilled in the art would recognize that in the methods described herein when the one plurality of particles is compared to another by PSD, dn, or both (e.g., $d10_{SCR}$ vs $d10_{REP}$), the same technique for determining PSD, dn, or both is used for all pluralities of particles being compared.

As described herein, the terms "particles" and "particulates" do not imply only a single type of particle, but rather encompasses a single type of particle and mixtures of types of particles. As used herein, the term "type of particle" indicates particles that are differentiated from other particles, for example, by composition, shape, or PSD. That is, particles may comprise a first type of particles, a second type of particles, and a third type of particles that can each be differentiated from the others by at least one of composition, shape, and PSD. For example, the first type of particles may be ground marble with a PSD with a d25 of 2 microns, d50 of 7 microns, and d75 of 18 microns, the second type of particles may be ground marble having a PSD with a d25 of 20 microns, d50 of 25 microns, and d75 of 30 microns, and the third type of particles may be a resilient carbon-based material having a PSD with a d25 of 15 microns, d50 of 40 microns, and d75 of 55 microns.

Figure 1:
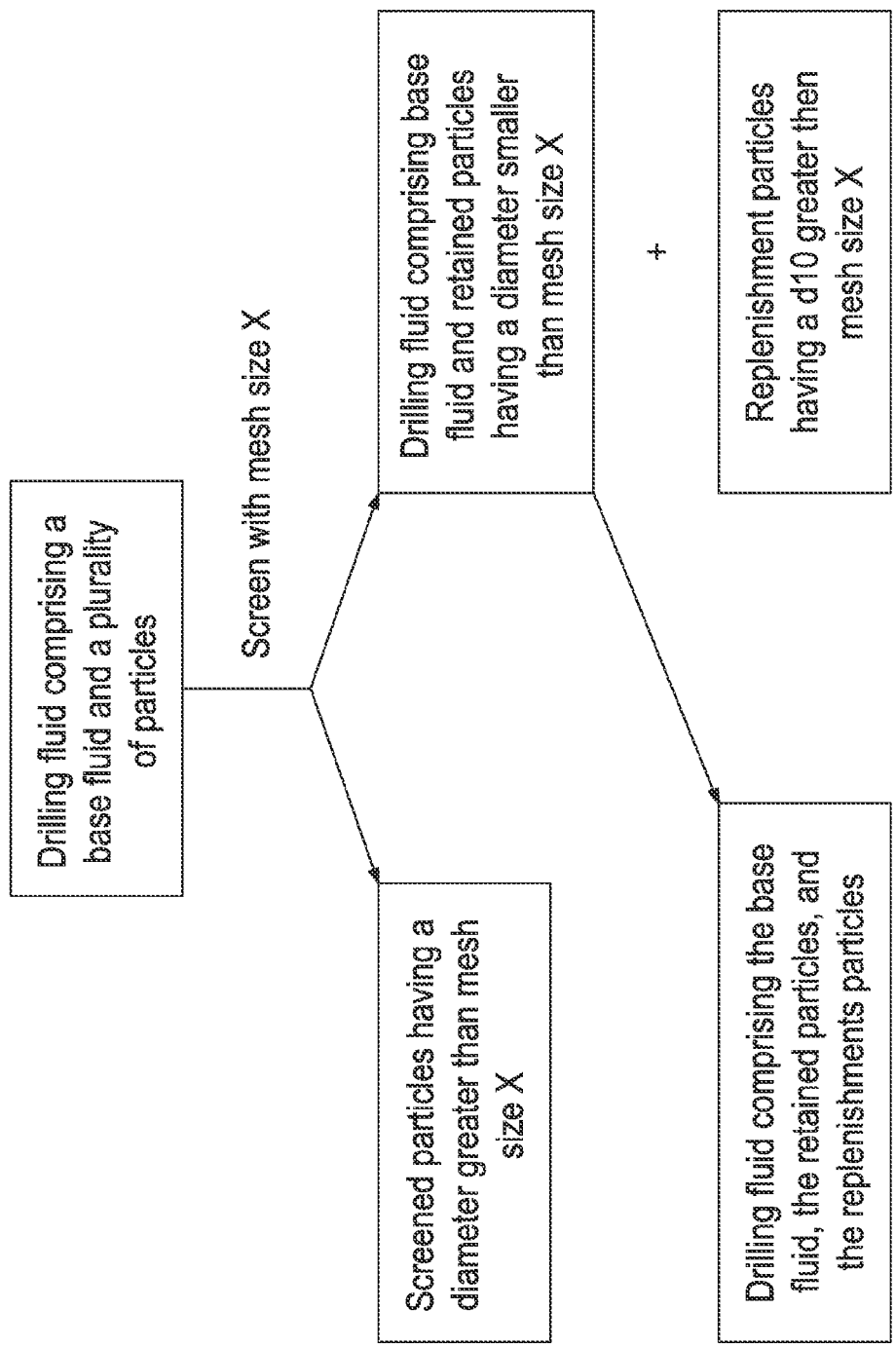
FIG. 1 provides a diagram of at least one embodiment for replacing particles screened from a drilling fluid.

FIG. 1 provides a diagram of at least one embodiment for replacing particles screened from a drilling fluid. After circulating through the wellbore and to the surface, the drilling fluid may be passed through a screen (e.g., in a shaker), so as to remove a portion of the first plurality of particles having a diameter greater than or equal to the mesh size of the screen, referred to herein as "screened particles." Then, replenishment particles may be added to the material that passes through the screen (e.g., a wellbore fluid comprising the base fluid and a second portion of the first plurality of particles having a diameter less than the mesh size, referred to herein as "retained particles"). The drilling fluid comprising the base fluid, the retained particles, and the replenishment particles may then be introduced back into the wellbore. This procedure may be performed continuously and over a time period such that a portion of the wellbore fluid is treated multiple times through this method.

For clarity and brevity, the following abbreviations will be used as subscript to indicate which particles are referred to for PSD and dn: BS—the plurality of particles in the drilling fluid before screening, SCR—the screened particles, RET—the retained particles, REP—the replenishment particles, and CMB—for the retained particles in combination with the replenishment particles.

In some embodiments, at least one the $dn_{BS}$ may differ from the corresponding $dn_{CMB}$ by less than about 15% (e.g., about 1% to about 15%, including subsets thereof). For example, the $d50_{BS}$ may be within 10% of the $d50_{CMB}$. In another example, the $d25_{BS}$, the $d50_{BS}$, and the $d75_{BS}$ may be within about 5%, about 10%, and about 15% of the $d25_{CMB}$, the $d50_{CMB}$, and the $d75_{CMB}$, respectively. In yet another example, the $d10_{BS}$, the $d50_{BS}$, and the $d90_{BS}$ may be within about 5%, about 10%, and about 15% of the $d10_{CMB}$, the $d50_{CMB}$, and the $d90_{CMB}$, respectively.

In some embodiments, the $d25_{REP}$ may be greater than or equal to the mesh size of the screen. In some embodiments, the $d15_{REP}$ may be greater than or equal to the mesh size of the screen. In some embodiments, the $d10_{REP}$ may be greater than or equal to the mesh size of the screen.

In some embodiments, the replenishment particles may be engineered to correspond to the screened particles. That is, the replenishment particles may comprise substantially the same types of particles in the same proportions as in the screened particles. In some embodiments, at least one of the $dn_{SCR}$ may differ from the corresponding $dn_{REP}$ by less than about 15% (e.g., about 1% to about 15%, including subsets thereof). In some embodiments, the $d25_{SCR}$, the $d50_{SCR}$, and the $d75_{SCR}$ may be within about 5% to about 15% of the $d25_{REP}$, the $d50_{REP}$, and the $d75_{REP}$, respectively. In some embodiments, the $d10_{SCR}$, the $d50_{SCR}$, and the $d90_{SCR}$ may be within about 5% to about 15% of the $d10_{REP}$, the $d50_{REP}$, and the $d90_{REP}$, respectively.

Screens suitable for use in conjunction with the methods and systems described herein may, in some embodiments, have a mesh size according to the API screen numbers of Table 1 or the US sieve sizes of Table 2.

TABLE 1

| API Screen Number | d100 (microns) |
|---|---|
| 35 | >462.5-550.0 |
| 40 | >390.0-462.5 |
| 45 | >327.5-390.0 |
| 50 | >275.0-327.5 |
| 60 | >231.0-275.0 |
| 70 | >196.0-231.0 |
| 80 | >165.0-196.0 |
| 100 | >137.5-165.0 |
| 120 | >116.5-137.5 |
| 140 | >98.0-116.5 |
| 170 | >82.5-98.0 |
| 200 | >69.0-82.5 |
| 230 | >58.0-69.0 |
| 270 | >49.0-58.0 |
| 325 | >41.5-49.0 |
| 400 | >35.0-41.5 |
| 450 | >28.5-35.0 |

TABLE 2

| API Screen Number | d100 (microns) |
|---|---|
| 3.5 | 5660 |
| 4 | 4760 |
| 5 | 4000 |
| 6 | 3360 |
| 7 | 2830 |
| 8 | 2380 |
| 10 | 2000 |
| 12 | 1680 |
| 14 | 1410 |
| 16 | 1190 |
| 18 | 1000 |
| 20 | 840 |
| 25 | 710 |
| 30 | 590 |
| 35 | 500 |
| 40 | 420 |
| 45 | 350 |
| 50 | 297 |
| 60 | 250 |
| 70 | 210 |
| 80 | 177 |
| 100 | 149 |
| 120 | 125 |
| 140 | 105 |
| 170 | 88 |
| 200 | 74 |
| 230 | 62 |
| 270 | 53 |
| 325 | 44 |
| 400 | 37 |

The rate of addition for the replenishment particles to the drilling fluid can be calculated from the concentration of the plurality of particles in the drilling fluid before screening, the $PSD_{BS}$, and the drilling fluid flow rate during screening. For example, the integral of the $PSD_{BS}$ greater than the mesh size and the concentration may be used to determine the mass of particles removed per unit volume, which combined with the fluid flow rate may be used to determine a removal rate and the corresponding rate of addition that should be used.

In some embodiments, the plurality of the particles in the drilling fluid, the mesh sizes in the screening, and the replenishment particles may be chosen in combination to facilitate the methods described herein. For example, in some embodiments, a drilling fluid may comprise a base fluid and a plurality of particles having a multi-modal diameter distribution such that the d75 of each mode is less than the d25 of the next larger mode (or, in some instance, the d90 of each mode is less than the d10 of the next larger mode). In some instances, one screen or a series of screens may be used during drilling operations that have a mesh size between the d75 of one mode and the d25 of the next larger mode (or, in some instance, a mesh size between the d90 of one mode and the d10 of the next larger mode). One skilled in the art would recognize other combinations of dn's suitable for use in relation to multi-modal diameter distributions and corresponding screen sizes (e.g., d75 with d10, d75 with d15, d90 with d25, d85 with d25, and so on).

Figure 2:
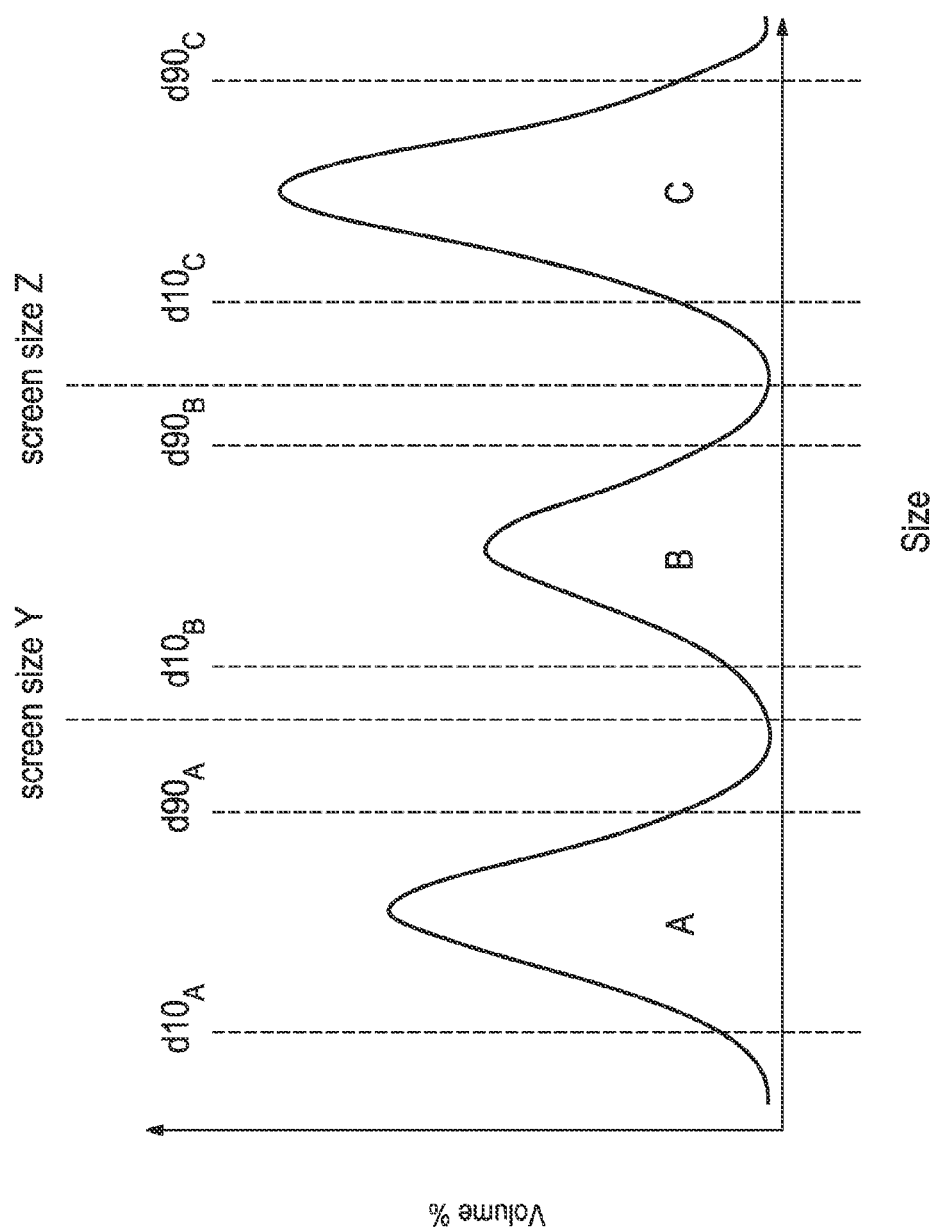
FIG. 2 provides a theoretical trimodal diameter distribution for a plurality of particles.

By way of nonlimiting example, FIG. 2 provides a theoretical trimodal diameter distribution for a plurality of particles that illustrates three modes A, B, and C where mode A has a $d90_A$ less than the $d10_B$ of the next largest mode (mode B) and mode B has a $d90_B$ less than the $d10_C$ of the next largest mode (mode C). Further, FIG. 2 illustrates appropriately sized screens relative to each mode. That is screen size Y is between $d90_A$ and $d10_B$ and screen size Z is between $d90_B$ and $d10_C$.

Figure 3:
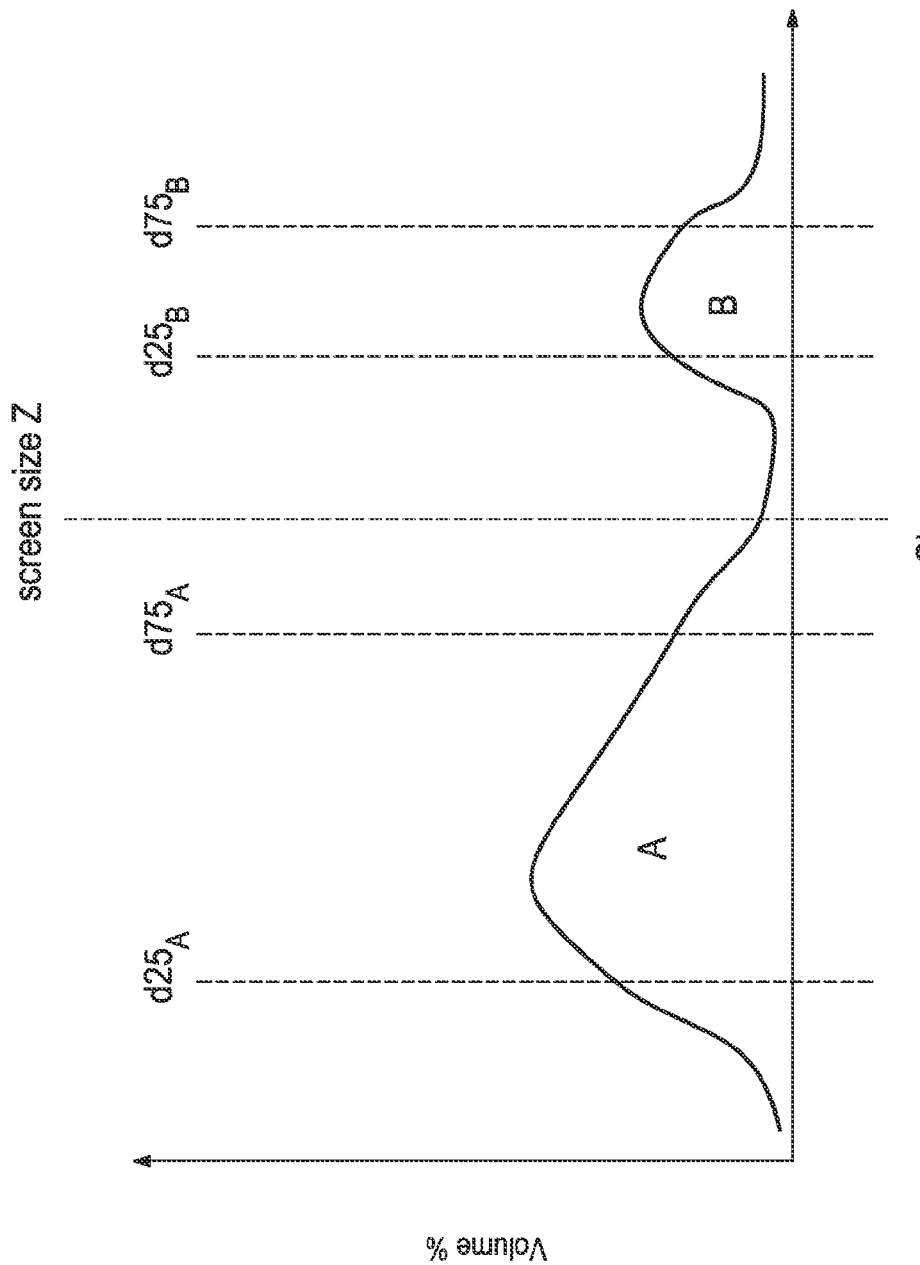
FIG. 3 provides a theoretical trimodal diameter distribution for a plurality of particles.

In another example, FIG. 3 provides a theoretical bimodal diameter distribution for a plurality of particles that illustrates two modes A and B where mode A has a $d75_A$ less than the $d25_B$ of mode B. Further, FIG. 3 illustrates appropriate screen sizes Z between $d75_A$ and $d25_B$.

In some embodiments, the screen sizes may be chosen based on the diameter distribution of the plurality of particles in the drilling fluid. In some instances, the diameter distribution for the plurality of particles (e.g., the dn for each mode or the dn for each type of particle) may be chosen based on the screen size.

In some instances, each mode in a multi-modal PSD may correspond to a type of particle or plurality of particles that are initially separate. Then, the particles may be mixed together in the appropriate ratios yield a multi-modal PSD to achieve the corresponding drilling fluid properties (e.g., viscosity and mud weight). In some embodiments, the replenishment particles may correspond to the particles of the mode or modes having a d25 greater than the mesh size of the screen. In some embodiments, the replenishment particles may correspond to the particles of the mode or modes having a d15 greater than the mesh size of the screen. In some embodiments, the replenishment particles may correspond to the particles of the mode or modes having a d10 greater than the mesh size of the screen.

The methods disclosed herein apply to particles that include weighting agents, LCMs, and the like, and any combination thereof.

Generally, weighting agents have a specific gravity greater than the specific gravity of the base fluid. Examples of weighting agents may be particles that comprise barite, hematite, ilmenite, galena, manganese oxide, iron oxide, magnesium tetroxide, magnetite, siderite, celesite, dolomite, manganese carbonate, insoluble polymeric materials, calcium carbonate, marble, polyethylene, polypropylene, graphitic materials, silica, limestone, dolomite, a salt (e.g., salt crystals), shale, bentonite, kaolinite, sepiolite, illite, hectorite, organo-clays, and the like. Combinations of these types of particles may be used in a weighting agent.

In some embodiments, LCMs may comprise particulates having a low aspect ratio (e.g., less than about 3), fibers, or both. Suitable LCMs may include those comprising materials suitable for use in a subterranean formation, which may include, but are not limited to, sand, shale, ground marble, bauxite, ceramic materials, glass materials, metal pellets, high strength synthetic fibers, resilient graphitic carbon, cellulose flakes, wood, resins, polymer materials (cross-linked or otherwise), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, composite materials, and any combination thereof. Suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof.

Specific examples of suitable LCM particulates may include, but not be limited to, BARACARB® particulates (ground marble, available from Halliburton Energy Services, Inc.) including BARACARB® 5, BARACARB® 25, BARACARB® 150, BARACARB® 600, BARACARB® 1200; STEELSEAL® particulates (resilient graphitic carbon, available from Halliburton Energy Services, Inc.) including STEELSEAL® 50, STEELSEAL® 150, STEELSEAL® 400 and STEELSEAL® 1000; WALL-NUT® particulates (ground walnut shells, available from Halliburton Energy Services, Inc.) including WALL-NUT® coarse, WALL-NUT® medium, and WALL-NUT® fine; BARA-PLUG® (sized salt, available from Halliburton Energy Services, Inc.) including BARAPLUG® 20, BARAPLUG® 50, and BARAPLUG® 3/300; BARAFLAKE® (flake calcium carbonate, available from Halliburton Energy Services, Inc.); and the like; and any combination thereof.

Examples of suitable LCM fibers may include, but not be limited to, fibers of cellulose including viscose cellulosic fibers, oil coated cellulosic fibers, and fibers derived from a plant product like paper fibers; carbon including carbon fibers; melt-processed inorganic fibers including basalt fibers, woolastonite fibers, non-amorphous metallic fibers, metal oxide fibers, mixed metal oxide fibers, ceramic fibers, and glass fibers; polymeric fibers including polypropylene fibers and poly(acrylic nitrile) fibers; metal oxide fibers; mixed metal oxide fibers; and the like; and any combination thereof. Examples may also include, but not be limited to, PAN fibers, i.e., carbon fibers derived from poly(acrylonitrile); PANEX® fibers (carbon fibers, available from Zoltek) including PANEX® 32, PANEX® 35-0.125", and PANEX® 35-0.25"; PANOX® (oxidized PAN fibers, available from SGL Group); rayon fibers including BDF™ 456 (rayon fibers, available from Halliburton Energy Services, Inc.); poly(lactide) ("PLA") fibers; alumina fibers; cellulosic fibers; BAROFIBRE® fibers including BAROFIBRE® and BAROFIBRE® C (cellulosic fiber, available from Halliburton Energy Services, Inc.); and the like; and any combination thereof.

In some embodiments, LCM particulates and/or fibers may comprise a degradable material. Nonlimiting examples of suitable degradable materials that may be used in the present invention include, but are not limited to, degradable polymers (crosslinked or otherwise), dehydrated compounds, and/or mixtures of the two. In choosing the appropriate degradable material, one should consider the degradation products that will result. As for degradable polymers, a polymer is considered to be "degradable" herein if the degradation is due to, inter alia, chemical and/or radical process such as hydrolysis, oxidation, enzymatic degradation, or UV radiation. Polymers may be homopolymers, random, linear, crosslinked, block, graft, and star- and hyper-branched. Such suitable polymers may be prepared by polycondensation reactions, ring-opening polymerizations, free radical polymerizations, anionic polymerizations, carbocationic polymerizations, coordinative ring-opening polymerization, and any other suitable process. Specific examples of suitable polymers include polysaccharides such as dextran or cellulose; chitin; chitosan; proteins; orthoesters; aliphatic polyesters; poly(lactide); poly(glycolide); poly(ε-caprolactone); poly(hydroxybutyrate); poly(anhydrides); aliphatic polycarbonates; poly(orthoethers); poly(amino acids); poly(ethylene oxide); polyphosphazenes; and any combination thereof. Of these suitable polymers, aliphatic polyesters and polyanhydrides are preferred.

Dehydrated compounds may be used in accordance with the present invention as a degradable solid particulate. A dehydrated compound is suitable for use in the present invention if it will degrade over time as it is rehydrated. For example, particulate solid anhydrous borate material that degrades over time may be suitable. Specific examples of particulate solid anhydrous borate materials that may be used include, but are not limited to, anhydrous sodium tetraborate (also known as anhydrous borax) and anhydrous boric acid.

Degradable materials may also be combined or blended. One example of a suitable blend of materials is a mixture of poly(lactic acid) and sodium borate where the mixing of an acid and base could result in a neutral solution where this is desirable. Another example would include a blend of poly(lactic acid) and boric oxide, a blend of calcium carbonate and poly(lactic) acid, a blend of magnesium oxide and poly(lactic) acid, and the like. In certain preferred embodiments, the degradable material is calcium carbonate plus poly(lactic) acid. Where a mixture including poly(lactic) acid is used, in certain preferred embodiments the poly(lactic) acid is present in the mixture in a stoichiometric amount, e.g., where a mixture of calcium carbonate and poly(lactic) acid is used, the mixture comprises two poly(lactic) acid units for each calcium carbonate unit. Other blends that undergo an irreversible degradation may also be suitable, if the products of the degradation do not undesirably interfere with either the conductivity of the filter cake or with the production of any of the fluids from the subterranean formation.

In some embodiments, the concentration of the particles in a drilling fluid described herein may range from a lower limit of about 0.01 pounds per barrel ("PPB"), 0.05 PPB, 0.1 PPB, 0.5 PPB, 1 PPB, 3 PPB, 5 PPB, 10 PPB, 25 PPB, or 50 PPB to an upper limit of about 150 PPB, 100 PPB, 75 PPB, 50 PPB, 25 PPB, 10 PPB, 5 PPB, 4 PPB, 3 PPB, 2 PPB, 1 PPB, or 0.5 PPB, and wherein the concentration may range from any lower limit to any upper limit and encompass any subset therebetween.

Suitable base fluids for use in conjunction with embodiments described herein may include, but not be limited to, oil-based fluids, aqueous-based fluids, aqueous-miscible fluids, water-in-oil emulsions, or oil-in-water emulsions. Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. It should be noted that for water-in-oil and oil-in-water emulsions, any mixture of the above may be used including the water being and/or comprising an aqueous-miscible fluid.

Unless otherwise indicated, all numbers expressing quantities of ingredients, properties such as specific gravity, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques. Further, when "about" is provided at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

Figure 4:
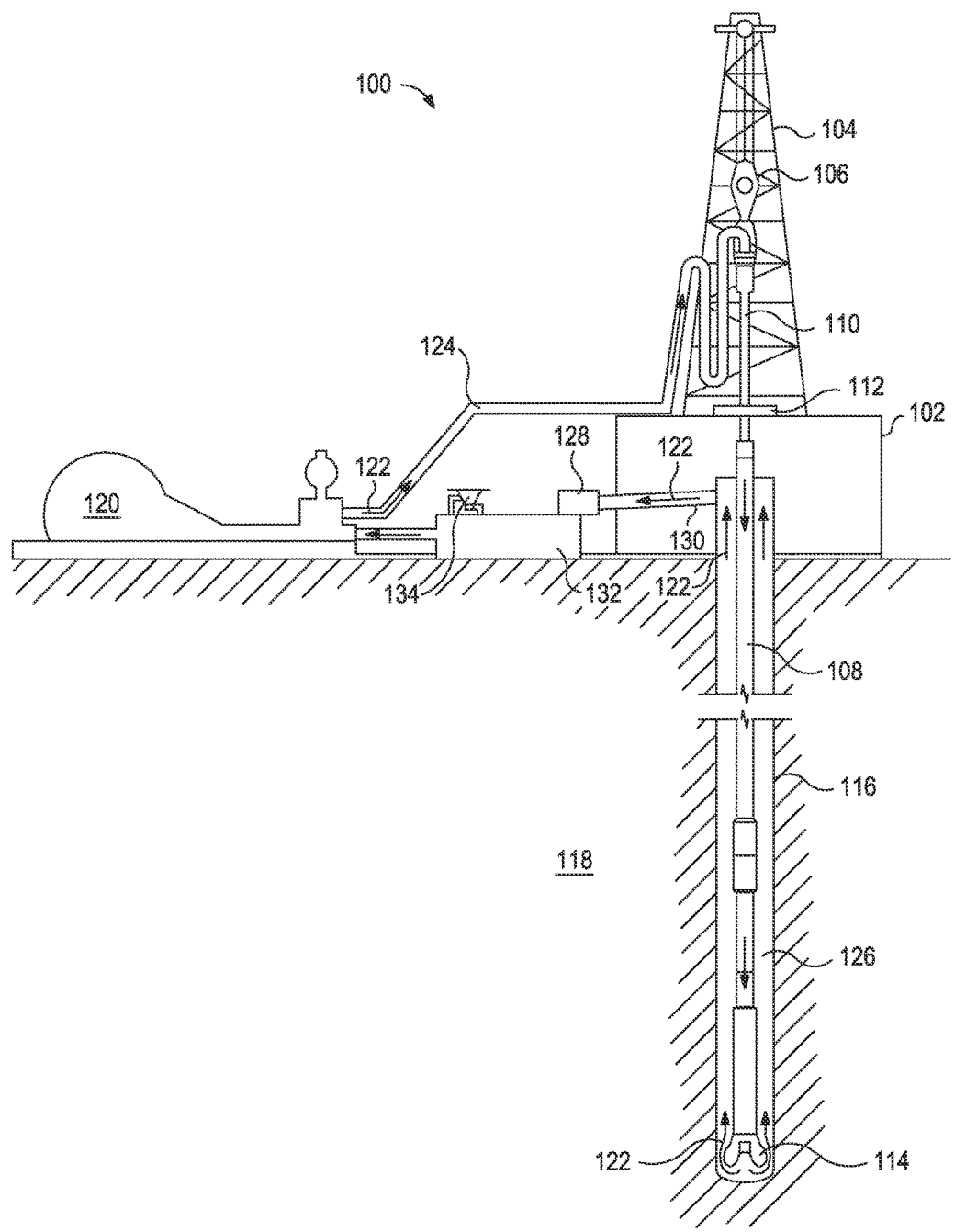
FIG. 4 provides a drilling assembly suitable for use in conjunction with the methods described herein.

With reference to FIG. 4, some embodiments described herein may include a wellbore drilling assembly 100. It should be noted that while FIG. 4 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

The replenishment particles may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the replenishment particles may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the particles disclosed herein may be stored, reconditioned, and/or regulated until added to the drilling fluid 122.

The fluid processing unit(s) 128 may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used to store, monitor, regulate, and/or recondition the particles described herein.

Some embodiments disclosed herein include: a method that includes circulating a drilling fluid comprising a base fluid and a plurality of particles through a wellbore penetrating a subterranean formation; passing the drilling fluid over a screen having a mesh size, thereby separating the plurality of particles into screened particles having a diameter greater than or equal to the mesh size and retained particles having a diameter smaller than the mesh size; adding a concentration of replenishment particles to the drilling fluid that comprises the base fluid and the retained particles, wherein a PSD of the replenishment particles has a $d25_{REP}$ greater than or equal to the mesh size; and re-circulating the drilling fluid including the replenishment particles back into the wellbore. Some embodiments may further include at least one of the following elements: Element 1: wherein a PSD of the plurality of particles has a $d50_{BS}$ and a PSD of the retained particles and the replenishment particles in combination has a $d50_{CMB}$, and wherein the $d50_{BS}$ and the $d50_{CMB}$ differ by less than about 15%; Element 2: wherein a PSD of the plurality of particles has a $d25_{BS}$ and a PSD of the retained particles and the replenishment particles in combination has a $d25_{CMB}$, and wherein the $d25_{BS}$ and the $d25_{CMB}$ differ by less than about 15%; Element 3: wherein a PSD of the plurality of particles has a $d75_{BS}$ and a PSD of the retained particles and the replenishment particles in combination has a $d75_{CMB}$, and wherein the $d75_{BS}$ and the $d75_{CMB}$ differ by less than 15%; Element 4: wherein a PSD of the plurality of particles has a $d50_{BS}$ and a PSD of the retained particles and the replenishment particles in combination has a $d50_{CMB}$; wherein the $d50_{BS}$ and the $d50_{CMB}$ differ by less than about 10%; wherein the PSD of the plurality of particles has a $d25_{BS}$ and the PSD of the retained particles and the replenishment particles in combination has a $d25_{CMB}$; wherein the $d25_{BS}$ and the $d25_{CMB}$ differ by less than about 5%; wherein the PSD of the plurality of particles has a $d75_{BS}$ and the PSD of the retained particles and the replenishment particles in combination has a $d75_{CMB}$; and wherein the $d75_{BS}$ and the $d75_{CMB}$ differ by less than 15%; Element 5: wherein a PSD of the plurality of particles has a $d10_{BS}$ and a PSD of the retained particles and the replenishment particles in combination has a $d10_{CMB}$, and wherein the $d10_{BS}$ and the $d10_{CMB}$ differ by less than about 15%; Element 6: wherein a PSD of the plurality of particles has a $d90_{BS}$ and a PSD of the retained particles and the replenishment particles in combination has a $d90_{CMB}$, and wherein the $d90_{BS}$ and the $d90_{CMB}$ differ by less than 15%; Element 7: wherein a PSD of the plurality of particles has a $d50_{BS}$ and a PSD of the retained particles and the replenishment particles in combination has a $d50_{CMB}$; wherein the $d50_{BS}$ and the $d50_{CMB}$ differ by less than about 10%; wherein the PSD of the plurality of particles has a $d10_{BS}$ and the PSD of the retained particles and the replenishment particles in combination has a $d10_{CMB}$; wherein the $d10_{BS}$ and the $d10_{CMB}$ differ by less than about 5%; wherein the PSD of the plurality of particles has a $d90_{BS}$ and the PSD of the retained particles and the replenishment particles in combination has a $d90_{CMB}$; and wherein the $d90_{BS}$ and the $d90_{CMB}$ differ by less than 15%; Element 8: wherein a PSD of the screened particles has a $d50_{SCR}$ and the PSD of the replenishment particles has a $d50_{REP}$, and wherein the $d50_{SCR}$ and the $d50_{REP}$ differ by less than about 15%; Element 9: wherein a PSD of the screened particles has a $d25_{SCR}$, and wherein the $d25_{SCR}$ and the $d25_{REP}$ differ by less than about 15%; Element 10: wherein a PSD of the screened particles has a $d75_{SCR}$ and the PSD of the replenishment particles has a $d75_{REP}$, and wherein the $d75_{SCR}$ and the $d75_{REP}$ differ by less than about 15%; Element 11: wherein a PSD of the screened particles has a $d10_{SCR}$ and the PSD of the replenishment particles has a $d10_{REP}$, and wherein the $d10_{SCR}$ and the $d10_{REP}$ differ by less than about 15%; Element 12: wherein a PSD of the screened particles has a $d90_{SCR}$ and the PSD of the replenishment particles has a $d90_{REP}$, and wherein the $d90_{SCR}$ and the $d90_{REP}$ differ by less than about 15%; Element 13: wherein a PSD of the screened particles has a $d50_{SCR}$ and the PSD of the replenishment particles has a $d50_{REP}$; wherein the $d50_{SCR}$ and the $d50_{REP}$ differ by less than about 10%; wherein the PSD of the screened particles has a $d25_{SCR}$; wherein the $d25_{SCR}$ and the $d25_{REP}$ differ by less than about 5%; wherein the PSD of the screened particles has a $d75_{SCR}$ and the PSD of the replenishment particles has a $d75_{REP}$; and wherein the $d75_{SCR}$ and the $d75_{REP}$ differ by less than about 15%; Element 14: wherein a PSD of the screened particles has a $d50_{SCR}$ and the PSD of the replenishment particles has a $d50_{REP}$; wherein the $d50_{SCR}$ and the $d50_{REP}$ differ by less than about 10%; wherein the PSD of the screened particles has a $d10_{SCR}$; wherein the $d10_{SCR}$ and the $d10_{REP}$ differ by less than about 5%; wherein the PSD of the screened particles has a $d90_{SCR}$ and the PSD of the replenishment particles has a $d90_{REP}$; and wherein the $d90_{SCR}$ and the $d90_{REP}$ differ by less than about 15%; Element 15: wherein the steps are performed for several wellbore volumes of the drilling fluid; Element 16: wherein the plurality of particles comprises a first type of particle and a second type of particle having different specific gravities; Element 17: wherein the plurality of particles comprises a first type of particle and a second type of particle having different compositions; Element 18: wherein the plurality of particles comprises a first type of particle that is a low aspect ratio particle and a second type of particle that is a fiber; Element 19: wherein the plurality of particles comprises at least one of a weighting agent and a lost circulation material; and Element 20: wherein the mesh size is about 35 to about 450 API screen number. Examples of suitable combinations of elements may include, but are not limited to: Element 1 in combination with Element 8; Element 2 in combination with Element 9; Element 3 in combination with Element 10; Element 4 in combination with Element 11; Element 5 in combination with Element 12; Element 6 in combination with Element 13; Element 7 in combination with Element 14; at least two of Elements 1-3 and 5-6 in combination; at least two of Elements 8-10 and 12-13 in combination; at least two of Elements 1-3 and 5-6 in combination with at least two of Elements 8-10 and 12-13; at least one of Elements 16-19 in combination with any of the foregoing; at least two of Elements 16-19 in combination; Element 20 in combination with any of the foregoing; Element 15 in combination with any of the foregoing; Element 20 in combination with one of Elements 1-19; and Element 15 in combination with one of Elements 1-14 and 16-19.

Some embodiments disclosed herein include: a method that includes circulating a drilling fluid comprising a base fluid and a plurality of particles through a wellbore penetrating a subterranean formation, wherein the plurality of particles has a multimodal distribution that includes a first mode having a first d50 lower than a second d50 of a second mode, and wherein the first mode has a d75 less than a d25 of the second mode; passing the drilling fluid over a screen having a mesh size between the d75 of the first mode and the d25 of the second mode, thereby separating the plurality of particles into screened particles having a diameter greater than or equal to the mesh size and retained particles having a diameter smaller than the mesh size; adding a concentration of replenishment particles having a d25 greater than or equal to the mesh size to the drilling fluid that comprises the base fluid and the retained particles; and re-circulating the drilling fluid including the replenishment particles back into the wellbore. Some embodiments may further include at least one of the following elements: Element 21: wherein the first mode has a d90 less than a d10 of the second mode; Element 22: wherein the mesh size is between a d90 of the first mode and a d10 of the second mode; Element 23: wherein the replenishment particles have a d10 greater than or equal to the mesh size; Element 24: wherein the steps are performed for several wellbore volumes of the drilling fluid; Element 25: wherein the plurality of particles comprises a first type of particle and a second type of particle having different specific gravities; Element 26: wherein the plurality of particles comprises a first type of particle and a second type of particle having different compositions; Element 27: wherein the plurality of particles comprises a first type of particle that is a low aspect ratio particle and a second type of particle that is a fiber; Element 28: wherein the plurality of particles comprises at least one of a weighting agent and a lost circulation material; and Element 29: wherein the mesh size is about 35 to about 450 API screen number. Examples of suitable combinations of elements may include, but are not limited to: at least two of Elements 21-23 in combination; at least two of Elements 25-28 in combination; at least one of Elements 21-23 in combination with at least one of Elements 25-28; Element 29 in combination with any of the foregoing; Element 24 in combination with any of the foregoing; Element 29 in combination with at least one of Elements 21-23; Element 24 in combination with at least one of Elements 21-23; Element 29 in combination with at least one of Elements 25-28; and Element 24 in combination with at least one of Elements 25-28.

Some embodiments disclosed herein include: a method that includes circulating a drilling fluid comprising a base fluid and a plurality of particles through a wellbore penetrating a subterranean formation, wherein the plurality of particles has a multimodal distribution that includes a first mode having a first d50 lower than a second d50 of a second mode, and wherein the first mode has a d75 less than a d25 of the second mode, and wherein a first type of particle corresponds to the first mode and a second type of particle corresponds to the second mode; passing the drilling fluid over a screen having a mesh size between the d75 of the first mode and the d25 of the second mode, thereby removing a portion of the second type of particle; adding a concentration of the second type of particle to the drilling fluid; and re-circulating the drilling fluid including the replenishment particles into the wellbore. Some embodiments may further include at least one of the following elements: Element 30: wherein the first mode has a d90 less than a d10 of the second mode; Element 31: wherein the mesh size is between a d90 of the first mode and a d10 of the second mode; Element 32: wherein the steps are performed for several wellbore volumes of the drilling fluid; Element 33: wherein the plurality of particles comprises a first type of particle and a second type of particle having different specific gravities; Element 34: wherein the plurality of particles comprises a first type of particle and a second type of particle having different compositions; Element 35: wherein the plurality of particles comprises a first type of particle that is a low aspect ratio particle and a second type of particle that is a fiber; Element 36: wherein the plurality of particles comprises at least one of a weighting agent and a lost circulation material; and Element 37: wherein the mesh size is about 35 to about 450 API screen number. Examples of suitable combinations of elements may include, but are not limited to: Element 30 and 31 in combination; at least one of Elements 30-31 in combination with at least one of Elements 33-36; Element 37 in combination with any of the foregoing; Element 32 in combination with any of the foregoing; Element 37 in combination with at least one of Elements 30-31; Element 32 in combination with at least one of Elements 30-31; Element 37 in combination with at least one of Elements 33-36; and Element 32 in combination with at least one of Elements 33-36.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
    circulating a drilling fluid comprising a base fluid and a plurality of particles through a wellbore penetrating a subterranean formation, wherein the plurality of particles has a multimodal distribution that includes a first mode having a first d50 lower than a second d50 of a second mode, and wherein the first mode has a d75 less than a d25 of the second mode, and wherein a first type of particle corresponds to the first mode and a second type of particle corresponds to the second mode;
    passing the drilling fluid over a screen having a mesh size between the d75 of the first mode and the d25 of the second mode, thereby removing a portion of the second type of particle;
    adding a concentration of the second type of particle to the drilling fluid, wherein the second type of particle have a d10 greater than or equal to the mesh size of the screen; and
    then, re-circulating the drilling fluid into the wellbore.

2. The method of claim 1, wherein the first type of particle and the second type of particle have different specific gravities.

3. The method of claim 1, wherein the first type of particle and the second type of particle have different compositions.

4. The method of claim 1, wherein the first type of particle has an aspect ratio less than about 3 and the second type of particle is a fiber.

5. The method of claim 1, wherein the mesh size is about 35 to about 450 API screen number.

6. The method of claim 1, wherein the steps are performed for several wellbore volumes of the drilling fluid.

7. The method of claim 1, wherein the plurality of particles comprises at least one of a weighting agent and a lost circulation material.

8. The method of claim 7, wherein the weighting agent is selected from the group consisting of: barite, hematite, ilmenite, galena, manganese oxide, iron oxide, magnesium tetroxide, magnetite, siderite, celesite, dolomite, manganese carbonate, calcium carbonate, marble, polyethylene, polypropylene, graphitic material, silica, limestone, dolomite, shale, bentonite, kaolinite, sepiolite, illite, hectorite, an organo-clay, and combinations thereof.

9. The method of claim 7, wherein the lost circulation material is selected from the group consisting of: sand, shale, ground marble, bauxite, ceramic material, glass material, metal pellets, high strength synthetic fibers, resilient graphitic carbon, cellulose flakes, wood, resins, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, and any combination thereof.

10. The method of claim 7, wherein the lost circulation material is a fiber selected from the group consisting of: cellulose fibers; viscose cellulosic fibers; oil coated cellulosic fibers; paper fibers; carbon fibers; basalt fibers; woolastonite fibers; non-amorphous metallic fibers; metal oxide fibers; mixed metal oxide fibers; ceramic fibers; glass fibers; polypropylene fibers; poly(acrylic nitrile) fibers; and any combination thereof.

11. The method of claim 7, wherein the lost circulation material is degradable.

12. The method of claim 1, wherein the concentration of the particles in a drilling fluid described herein may range from about 0.01 pounds per barrel to about 150 pounds per barrel.

* * * * *